(12) United States Patent
Serizawa (10) Patent No.: US 6,715,908 B2
(45) Date of Patent: Apr. 6, 2004

(54) PROJECTION-TYPE VEHICULAR LAMP HAVING REDUCED DEFORMATION OF REFLECTOR DUE TO WEIGHT-INDUCED STRAIN

(75) Inventor: Yukio Serizawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/322,429

(22) Filed: Dec. 19, 2002

(65) Prior Publication Data
US 2003/0117812 A1 Jun. 26, 2003

(30) Foreign Application Priority Data
Dec. 26, 2001 (JP) .................................... P.2001-394743

(51) Int. Cl.[7] ................................................ B60Q 1/04
(52) U.S. Cl. ......................... 362/528; 362/273; 362/370
(58) Field of Search .................................. 362/271, 273, 362/370, 430, 432, 427, 428, 420, 421, 287, 289, 514, 515, 525, 528, 531, 532

(56) References Cited
U.S. PATENT DOCUMENTS

| | | |
|---|---|---|
| 3,932,837 A | 1/1976 | Baker |
| 3,949,215 A | 4/1976 | Whitney |
| 4,188,655 A | 2/1980 | Tallon et al. |
| 5,209,558 A | 5/1993 | Suzuki et al. |
| 6,227,690 B1 | 5/2001 | Matsubara et al. |
| 6,511,215 B2 * | 1/2003 | Hashigaya .................. 362/515 |

* cited by examiner

Primary Examiner—Y My Quach Lee
(74) Attorney, Agent, or Firm—Sughrue Mion, PLLC (57) ABSTRACT

A vehicular lamp which employs one or more projector lamp units and which is capable of preventing a reflector from being deformed by weight-induced strain while achieving and maintaining required light distribution characteristics. In one embodiment, the vehicular lamp includes first and second lamp units provided with respective reflectors, light sources, and projection lenses, with each lamp unit being tiltably supported on a lamp body via brackets formed separately at least from the reflectors. The brackets are tiltably supported at fulcrums the lamp body. Even in a case where stresses resulting from the weights of the lamp units are applied to bearings to the fulcrums, the stresses can be attenuated or absorbed by the brackets and the reflectors of the lamp units are not strained. Thus, the reflectors are prevented from being deformed, and the lamp units can achieve desired light distribution characteristics.

11 Claims, 6 Drawing Sheets

PROJECTION-TYPE VEHICULAR LAMP HAVING REDUCED DEFORMATION OF REFLECTOR DUE TO WEIGHT-INDUCED STRAIN

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp. More specifically, the present invention relates to a vehicular lamp wherein a lamp unit provided with a light source, a reflector, and a condenser lens is fitted in a lamp body and the lamp unit is tiltably supported in the lamp body so as to permit aiming adjustment of the lamp.

A projector lamp unit has been employed in a vehicular lamp for automobiles and the like. In a projector lamp unit (hereinafter referred to simply as a lamp unit), a bulb forming a light source is supported on a reflector, and a lens is attached to a front opening portion of the reflector by means of a holder or the like so as to realize a functional unit. In a case where a headlamp for a vehicle is constructed using such a lamp unit, the lamp unit is mounted in the lamp body in such a manner as to be tiltably supported on a fulcrum within the lamp body. Further, the lamp unit is coupled to and supported by the lamp body at positions vertically separated from the fulcrum by aiming screws. The aiming screws are rotated to effect aiming adjustment. That is, the lamp unit is vertically tilted around the fulcrum upon rotation of the aiming screws, whereby the direction of the optical axis of the lamp unit can be adjusted.

In the vehicular lamp described above, a supporting piece is formed integrally with part of the reflector, and the fulcrum for tiltably supporting the lamp unit is located on the supporting piece. With this construction, the weight of the lamp unit acts on the supporting piece in a concentrated manner, and stress resulting from the weight of the lamp is applied to the supporting piece. Thus, the reflector integrated with the supporting piece is strained, which can result in deformation of the reflective surface of the reflector to such an extent that the lamp can no longer provide the desired light distribution characteristics. Especially because a lamp unit of this type has a thick lens so as to achieve the desired light distribution characteristics, the center of gravity of the lamp unit is offset toward the front lens, resulting in a weight moment being constantly applied to the supporting piece since the latter is located behind the lens. Hence, the reflector tends to be severely strained. Furthermore, in a case where a four-lamp type automotive headlamp is constructed using lamp units of such a type, it is required that two lamp units be tiltably supported on the lamp body on each of left and right sides. In this case, the total weight of the lamp units is almost doubled, and the stress applied to the supporting piece is increased as well. As a result, the reflector may be severely strained.

BRIEF SUMMARY OF THE INVENTION

It is an object of the present invention to provide a vehicular lamp which employs a projector lamp unit whose reflector is not strained and which can maintain required light distribution characteristics.

The present invention provides a vehicular lamp wherein a lamp unit is tiltably supported in a lamp body, wherein a bracket formed separately at least from the reflector is formed integrally with the lamp unit, and the bracket is tiltably supported at a fulcrum on the lamp body. It is preferable that the fulcrum be disposed on a vertical line including the center of gravity of the lamp unit or a nearby position. It is also possible to provide at least one additional lamp unit supported by the bracket, in which case a plurality of fulcrums are formed on the lamp body on an axis around which the bracket tilts, the bracket is supported at one of the fulcrums, and part of each additional lamp unit is supported at another of the other fulcrums.

According to the present invention, even in a case where stress resulting from the weight of the lamp unit is applied to the fulcrum, the stress can be attenuated or absorbed by the bracket, and hence the reflector of the lamp unit is not strained. In particular, if the fulcrum is disposed at a position immediately below or close to the center of gravity of the lamp unit, no rotational moment or the like resulting from the weight of the lamp unit is applied to the fulcrum, and the reflector can be prevented from being strained. Furthermore, in a case where a plurality of lamp units are integrally supported, the weights of the lamp units are supported in a dispersed manner by a plurality of fulcrums. Hence, the stress applied to each of the fulcrums is reduced, and the reflector prevented from being strained.

DETAILED DESCRIPTION OF THE INVENTION

Preferred embodiments of the present invention will be described with reference to the drawings.

Figure 1:
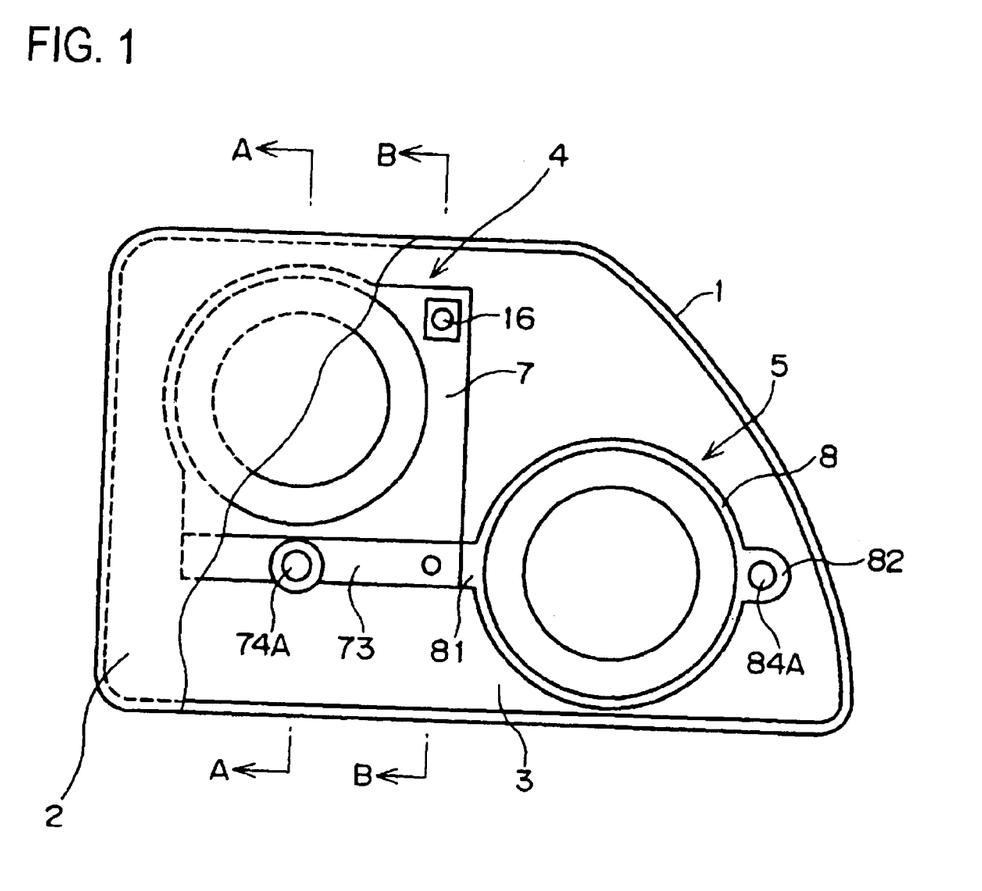
FIG. 1 is a partially cut-away front view of an embodiment in which the present invention is applied to a headlamp of a vehicle.
Figure 2:
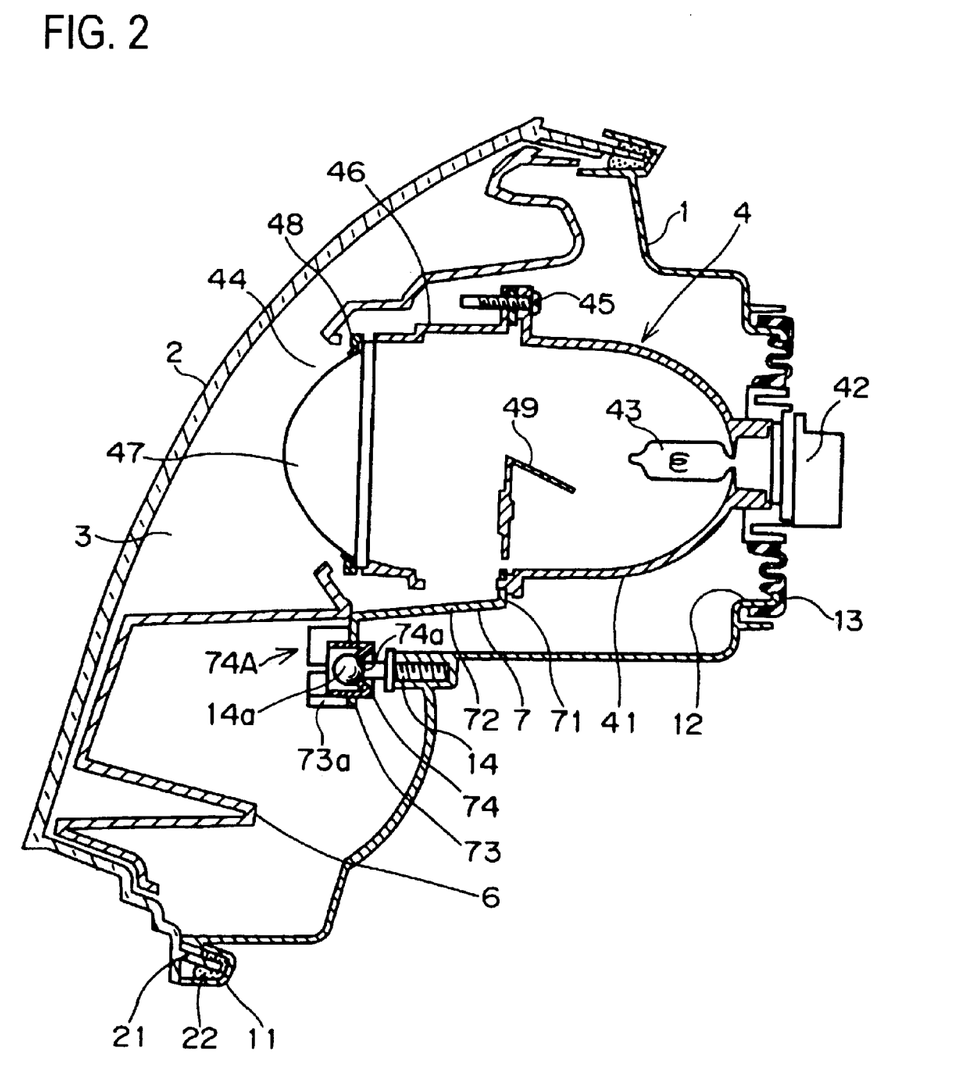
FIG. 2 is a cross-sectional view taken along a line AA shown in FIG. 1.
Figure 3:
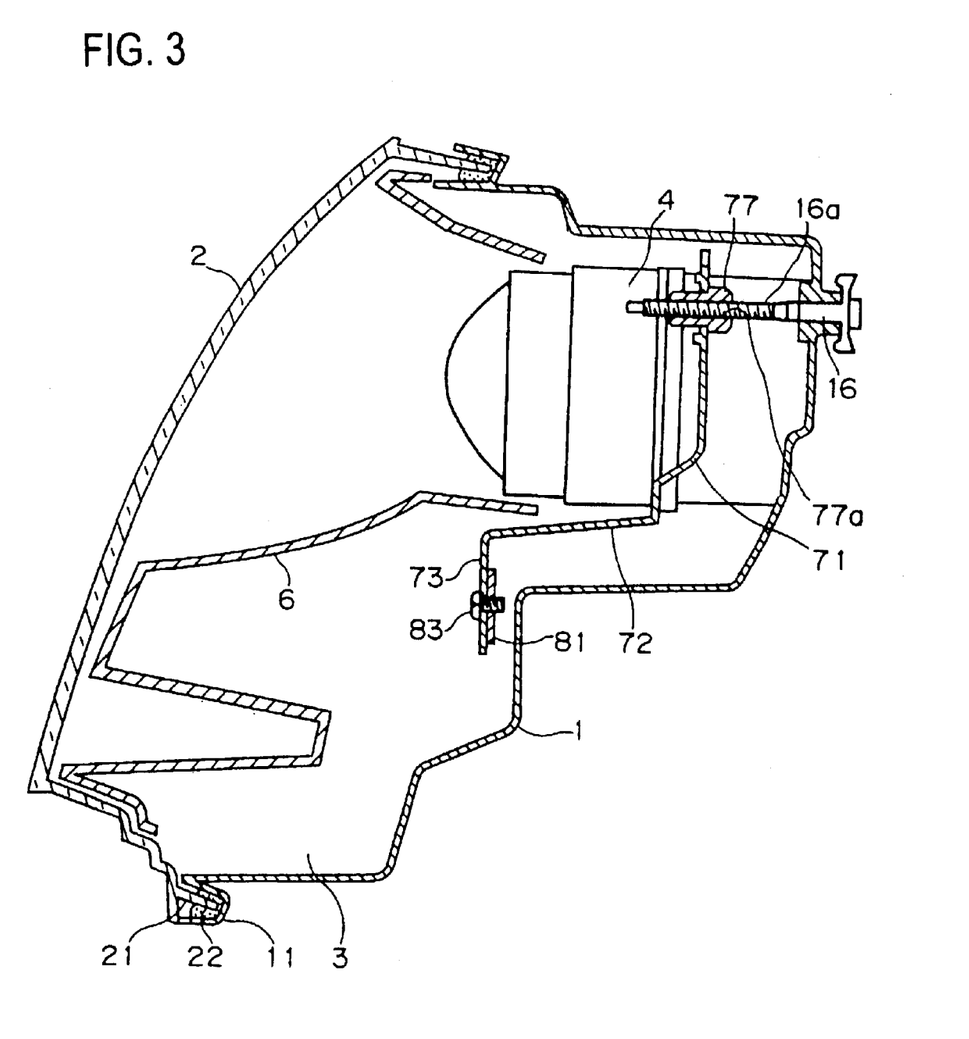
FIG. 3 is a cross-sectional view taken along a line BB shown in FIG. 1.
Figure 4:
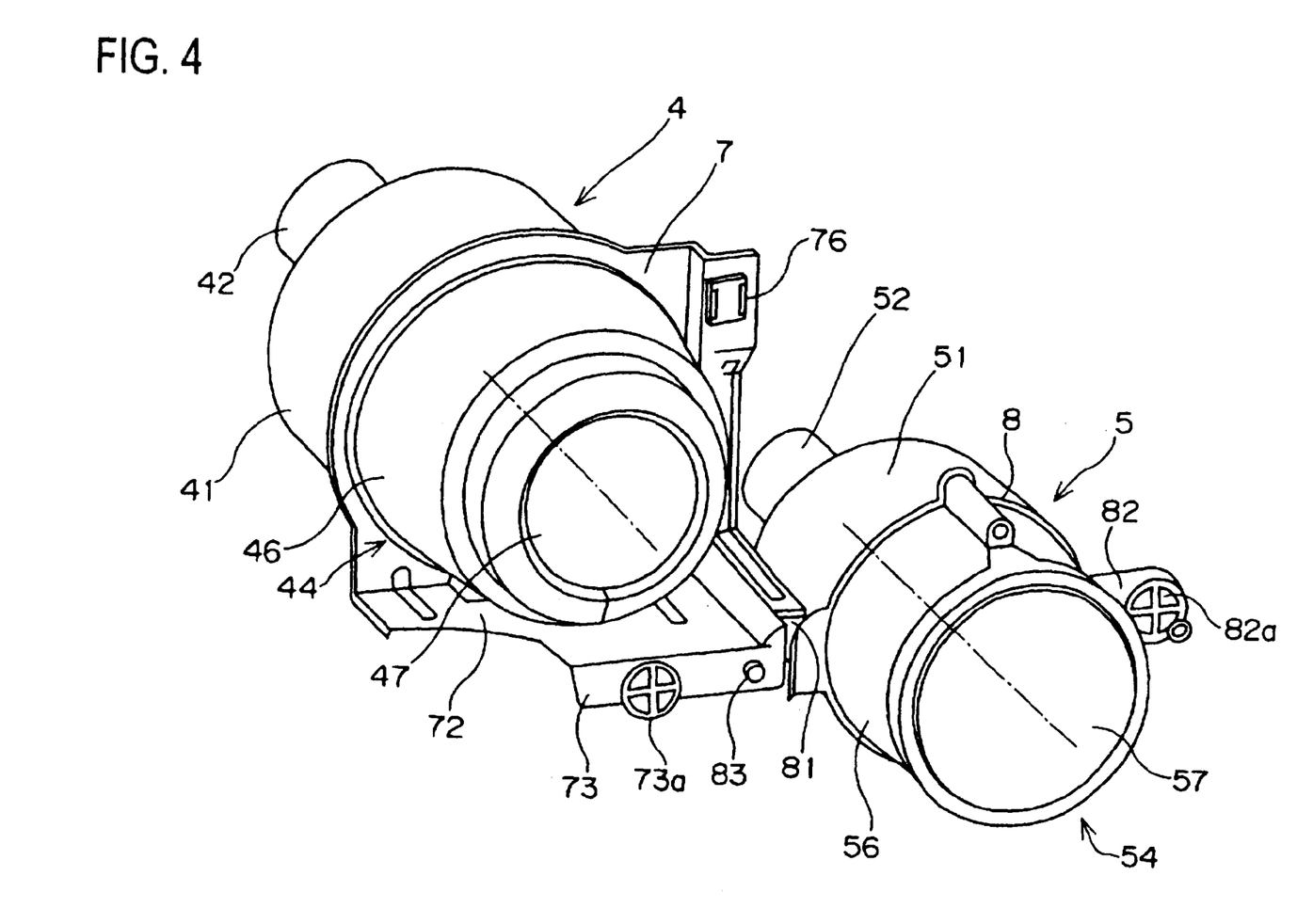
FIG. 4 is a perspective view of an essential part of the lamp shown in FIG. 1.
Figure 5:
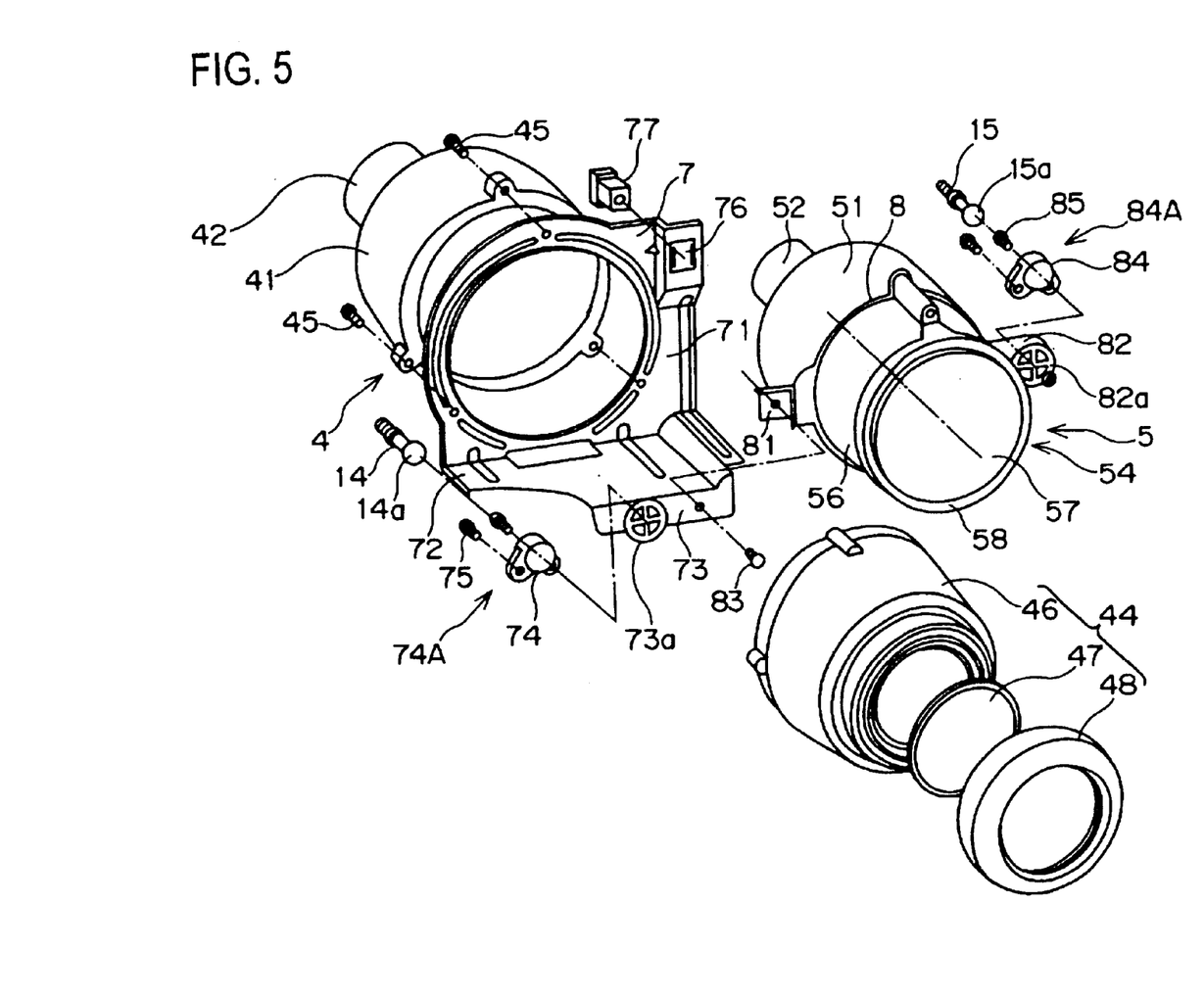
FIG. 5 is an exploded perspective view of FIG. 2.

FIG. 1 is a partially cut-away front view of a right-side headlamp constructed in accordance with a preferred embodiment in which the invention is applied to a four-lamp type headlamp for automobiles. FIG. 2 and FIG. 3 are cross-sectional views taken along lines AA and BB, respectively, shown in FIG. 1. FIG. 4 is a perspective view of an essential part of the headlamp. FIG. 5 is a partially exploded view of an essential part of the headlamp.

In FIG. 1, a lamp chamber 3 is defined by a lamp body 1 securely fixed to a vehicle body and a translucent cover 2 attached to a front opening of the lamp body 1. Two lamp units 4, 5 are mounted within the lamp chamber 3. A seal leg portion 21 formed on a peripheral portion of the translucent cover 2 is inserted into a seal groove 11 formed along the front opening of the lamp body 1 and attached by means of a sealing agent 22. The two lamp units 4, 5 are laterally disposed within the lamp chamber 3. The lamp unit 4 on the external side of the vehicle (i.e., the side of the vehicle toward the side of the road) is constructed as a low-beam lamp, while the lamp unit 5 on the central side of the vehicle (i.e., the side of the vehicle toward the center of the road) is constructed as a high-beam lamp. An extension 6, whose surface is plated with a metal such as aluminum, is disposed in the lamp chamber 3 and positioned such that the inner surface of the lamp body 1 is not visible from outside the two lamp units 4, 5. The extension 6 is supported by the lamp body 1. Furthermore, a socket insertion hole 12 is formed in the lamp body 1 at rearward positions of each of the lamp units 4, 5. Bulb sockets 42, which will be described in more detail later, are provided in the lamp units 4, 5. The bulb socket 42 of the lamp unit 4 is shown in FIG. 2. A rear end portion of this bulb socket 42 is inserted through and positioned in the socket insertion hole 12. A rubber cap 13 is fitted between the opening 12 and the bulb socket 42, whereby a waterproof structure is realized.

As shown in FIG. 2, the lamp unit 4 is provided with a reflector 41, a bulb 43, and a lens structure body 44. The reflector 41, which is formed generally in the shape of an ellipse of revolution, has a reflective inner surface. The bulb 43, which functions as a light source, is supported by the bulb socket 42, which attached to a socket attachment hole formed in the rear surface of the reflector 41. The lens structure body 44 is attached to the front opening of the reflector 41. As shown in FIG. 5, the lens structure body 44 is provided with a lens holder 46, a condenser lens 47, and a lens fixture 48. The lens holder 46 is formed in generally a cylindrical shape and is attached to a front end portion of the reflector 41 by means of screws 45. The condenser lens 47 is disposed on a front end surface of the lens holder 46. The lens fixture 48 is fitted to a front end portion of the lens holder 46 from a position in front of the condenser lens 47, whereby the condenser lens 47 is sandwiched between the lens holder 46 and the lens fixture 48. The lens holder 46 is provided with a shade 49 for blocking some of the light emitted by the light source 43. The same is also the case for the lamp unit 5. A lens structure body 54 provided with a reflector 51, a bulb socket 52, a lens holder 56, a condenser lens 57, and a lens fixture 58 is shown in FIGS. 4 and 5.

In the low-beam lamp unit 4, the reflector 41 and the lens holder 46 are attached to each other by means of the screws 45, as described above, with a bracket 7 sandwiched between the reflector 41 and the lens holder 46. The bracket 7 is provided with a vertical piece 71, a horizontal piece 72, and a supporting piece portion 73. The vertical piece 71 is formed in the shape of a circular frame corresponding to the cylindrical structures of the reflector 41 and the lens holder 46. The horizontal piece 72 curves forwards from a lower end edge of the vertical piece 71 substantially in the horizontal direction. The supporting piece portion 73 extends vertically downward from the front end edge of the horizontal piece 72. It is to be noted that the longitudinal length of the horizontal piece 72 is determined such that the supporting piece portion 73 is located immediately below or close to the center of gravity of the lamp unit 4. A concave fitting hole 73a is formed in the supporting piece portion 73 at a position slightly offset toward the high-beam lamp unit 5 from a position immediately below the center of gravity. A ball receiver 74 is fitted into the fitting hole 73a and fixed by means of a screw 75. The ball receiver 74 is formed by plastic molding. A spherical ball-receiving surface 74a is formed inside the ball receiver 74. A rectangular hole 76 is formed in the vertical piece 71 at a position located along the upper end edge thereof. An aiming nut 77 is fitted into and supported by the rectangular hole 76. An insertion hole 77a of a female threaded structure is formed in the aiming nut 77. A lance (not shown) is formed on the outer surface of the aiming nut 77, whereby the aiming nut 77 is retained within the rectangular hole 76.

In the high-beam lamp unit 5 as well, a bracket 8 is sandwiched between the reflector 51 and the lens holder 56. Protruding pieces 81, 82 are integrally formed on both sides of the bracket 8 extending horizontally outwards. The outer protruding piece 81, that is, the protruding piece 81 on the side of the low-beam lamp unit 4, forms a coupling piece, and is fixed to part of the supporting piece portion 73 of the bracket 7 by means of a screw 83. The inner protruding piece 82 on the other side forms a supporting piece. A ball receiver 84, which is identical to the ball receiver 74 on the side of the lamp unit 4, is fitted into a fitting hole 82a formed in a tip end portion of the protruding piece 82 and is fixed by means of a screw 85. It is to be noted that the protruding piece 81 and the protruding piece 82 are disposed in such a manner as to be aligned with the ball receiver 74 that is fitted to and supported by the bracket 7 on the side of the lamp unit 4. For convenience of explanation, the former ball receiver 74 formed in the supporting piece portion 73 of the bracket 7 will be referred to as a main ball receiver, and the latter ball receiver 84 formed in the protruding piece 82 will be referred to as a sub ball receiver.

The lamp units 4, 5, integrally connected by the brackets 7, 8, are mounted within the lamp chamber 3. The main ball receiver 74 and the sub ball receiver 84 vertically tiltably support the lamp units 4, 5 with respect to the lamp body 1. That is, rod-like ball screws 14, 15, whose tip ends are formed into ball portions 14a, 15a, respectively, are screwed into and thus fix the lamp body 1 at positions corresponding to the main ball receiver 74 and the sub ball receiver 84, respectively. The ball portions 14a, 15a of the ball screws 14, 15 are fitted into the main ball receiver 74 and the sub ball receiver 84, respectively, whereby a main ball bearing 74A and a sub ball bearing 84A are constituted. Because the main ball receiver 74 and the sub ball receiver 84 are aligned with each other, the main ball bearing 74A and the sub ball bearing 84A are also aligned with each other. Thus, the two lamp units 4, 5, which are integrated via the brackets 7, 8, are made vertically tiltable around a line connecting the two ball bearings 74A, 84A.

An aiming screw 16 is provided which is rotatably mounted on the rear surface wall of the lamp body 1 at a position opposed to the aiming nut 77 that is fitted into and supported by the rectangular hole 76 of the bracket 7. A threaded portion 16a of the aiming screw 16 is screwed into the aiming nut 77. Hence, by rotating the aiming screw 16 from a position outside the lamp body 1, the aiming nut 77 is moved in the axial direction of the aiming screw 16. The brackets 7, 8, and hence the lamp units 4, 5, are thereby vertically tiltably moved around the line connecting the two ball bearings 74A, 75A. As a result, the tilt angles of the two lamp units 4, 5, that is, the directions of the radiation optical axes of the two lamp units 4, 5, can be adjusted.

With the construction described above, the low-beam lamp unit 4 is tiltably supported by the lamp body 1 via the main ball bearing 74A formed in the bracket 7. Moreover, the main ball bearing 74A is disposed close to a position immediately below the center of gravity in the longitudinal direction of the low-beam lamp unit 4. Hence, the weight of the low-beam lamp unit 4 acts primarily in the vertical direction on the main ball bearing 74A. Therefore, even if the condenser lens 47 of the low-beam lamp unit 74A is heavy, almost no rotational moment acts on the main ball bearing 74A. Thus, both in the static case and the case where the tilt angle of the low-beam lamp unit 4 is adjusted by operating the aiming screw 16, very little stress is applied to the main ball bearing 74A. Even in a case where a small amount of stress is generated, since the bracket 7 is formed separately from the reflector 41 of the low-beam lamp unit 4, the stress is absorbed by strain on the bracket 7. Thus, strain-induced deformation of the reflector 41 is prevented. In this embodiment, the high-beam lamp unit 5 is coupled to the bracket 7 via the bracket 8, and is supported by the sub ball bearing 84A at the supporting piece 82 formed in the bracket 8. The sub ball bearing 84A is aligned with the main ball bearing 74A. Hence, the sum of the weights of the two lamp units 4, 5 acts on the main ball bearing 74A and the sub ball bearing 84A. However, since these weights are applied in a dispersed manner by the main ball bearing 74A and the sub ball bearing 84A, the stresses applied to the ball bearings 74A, 84A are reduced. Moreover, in the high-beam lamp unit 5, the stress applied to the supporting piece 82 is absorbed by the bracket 8, whereby the reflector 51 is prevented from being strained. Furthermore, since the main ball bearing 74A is disposed at a position offset toward the high-beam lamp unit 5 on the line connecting the main ball bearing 74A and the sub ball bearing 84A, the stress applied to the main ball bearing 74A is larger than the stress applied to the sub ball bearing 84A. However, the stress is absorbed by strain on the bracket 7 as described above. On the other hand, since the stress applied to the sub ball bearing 84A is small, there is very little likelihood that the reflectors 41, 51 would be subjected to damaging strain, as described above. That is, the reflectors are prevented from being subjected to significant amounts of strain in both the low-beam lamp unit 4 and the high-beam lamp unit 5. Therefore, the reflective surfaces of the reflectors are not deformed and the light distribution characteristics can be achieved and maintained.

Figure 6:
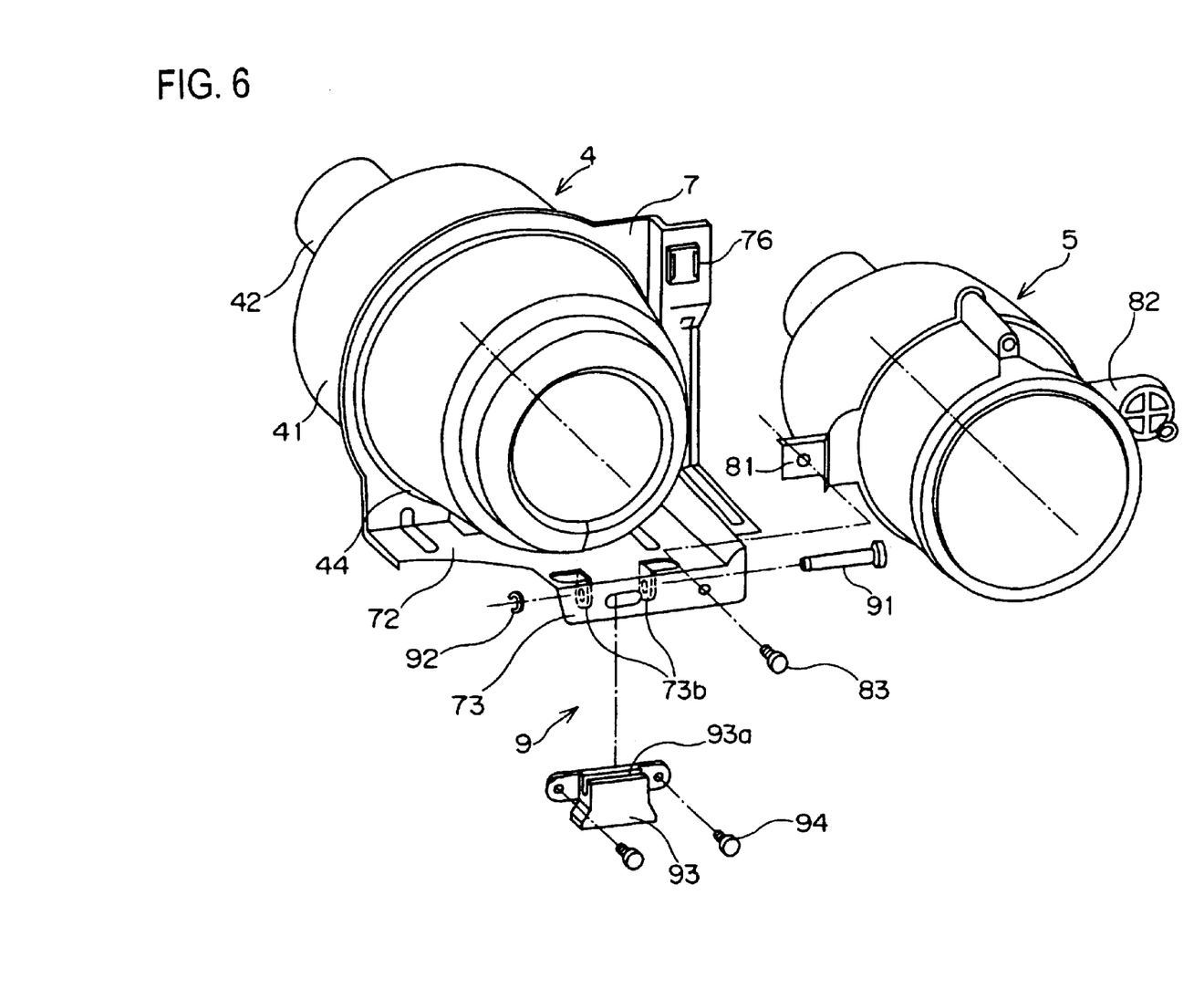
FIG. 6 is a perspective view of an essential part of another embodiment of the invention.

Because, as described above, the weight acting on the main ball bearing 74A is larger than the weight acting on the sub ball bearing 84A, it is preferable that the main ball bearing 74A have higher mechanical strength. FIG. 6 shows an example of such a bearing 9. A pair of tongue pieces 73b that are spaced apart from each other on a line serving as a fulcrum are cut from and extend downwards from the supporting piece portion 73 of the bracket 7, and a through-hole is formed in each of the tongue pieces. A shaft 91 is inserted in such a manner as to extend along the space between these openings, supported at both ends thereof by the tongue pieces 73b. A lock washer 92 is fitted onto the inserted tip end portion of the shaft 91, whereby the shaft 91 is retained between the tongue pieces 73b. A grommet 93 is fixed to the lamp body 1 at a position corresponding to the shaft 91 by means of a screw 94. The grommet 93 has a semicircular cross-section corresponding to the radial dimension of the shaft 91 and has a concave groove 93a that is substantially equal in length to the shaft 91. When the lamp unit 4 is supported by the lamp body 1, the shaft 91 is fitted into the concave groove 93a of the grommet 93 and thereby supported while being fitted into the concave groove 93a. In this bearing 9, the area of contact between the shaft 91 and the concave groove 93a is larger in comparison with the case of a ball bearing. Thus, the bearing 9 can more stably receive the weight of the lamp unit, and as a result makes it possible to more effectively prevent the lamp unit from being strained.

In the above-described embodiment, a headlamp in which the two lamp units 4, 5 are integrally tiltably supported is shown as an example. However, the present invention can be practiced as well in a case where a single lamp unit is tiltably supported in the same manner. In such a case, although not shown, it is appropriate that a bracket be formed in the same manner as in the case of the low-beam lamp unit of the aforementioned embodiment, and that the lamp unit be supported by the lamp body at the bracket by means of a shaft bearing or a ball bearing, also as mentioned above. In such a case, however, on the basic premise that the bearing is disposed immediately below or close to the center of gravity of the lamp unit in the longitudinal direction thereof, it is preferable that the bearing be disposed immediately below or close to the center of gravity of the lamp unit in the lateral direction thereof as well. Thus, the weight of the lamp unit vertically acts on the shaft bearing, whereby it becomes possible to effectively prevent the lamp unit from being strained.

Alternatively, it is also appropriate that two or more lamp units are coupled to a bracket of a single lamp unit, with these lamp units being integrally tiltably supported.

In the above-described embodiment, the bracket is formed separately from the lamp unit. However, the bracket may be formed integrally with a part other than the reflector, for example, the lens holder. Such construction is preferable from the standpoint of reducing the number of parts. Further, the bearing employed in the practice of the invention is not limited to a ball bearing or shaft bearing as described above, and it is possible to adopt another bearing structure.

As has been described above, the vehicular lamp of the present invention is designed that a bracket formed separately from the reflector is formed integrally with the lamp unit and the bracket is tiltably supported at a fulcrum on the lamp body. Therefore, even if stress resulting from the weight of the lamp unit is applied to the fulcrum, the stress can be attenuated or absorbed by the bracket, and the reflector of the lamp unit is not strained or deformed. In particular, by disposing the fulcrum at a position immediately below or close to the center of gravity of the lamp unit, no rotational moment or the like resulting from the weight of the lamp unit is applied to the fulcrum, thus protecting the reflector from being strained. In addition, in a case where a plurality of lamp units are integrally supported, the weights of the lamp units can be received in a dispersed manner by a plurality of fulcrums. In such a case, the stress applied to each of the fulcrums can be attenuated, and the reflector protected from strain and deformation.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising:

a lamp body;

first and second projector lamp units, said first projector lamp unit comprising a reflector, a light source mounted on said reflector, and a condenser lens unit jointed to said reflector, said condenser lens unit comprising a lens holder and a condenser lens held by said lens holder;

a first bracket attached to said first projector lamp unit and formed separately at least from said reflector, said first bracket comprising a supporting piece extending downward;

a second bracket attached to said second projector lamp unit, said second bracket comprising first and second protruding pieces on opposite sides of said second bracket extending horizontally outwards, said first protruding piece being coupled to an adjacent end portion of said first bracket; and first and second fulcrums tiltably supporting said first and second lamp units, respectively, on said lamp body along an axis including or near a vertical line including a center of gravity of said lamp units.

2. The vehicular lamp according to claim 1, wherein said first fulcrum comprises a first ball joint coupled to said first bracket, and wherein said second fulcrum comprises a second ball joint coupled to said second protruding piece.

3. The vehicular lamp according to claim 2, wherein said first protruding piece is fixed to an adjacent end portion of said supporting piece of said first bracket, and wherein said first ball joint is coupled to an end portion of said supporting piece opposite to said end portion to which said first protruding pieces is coupled.

4. The vehicular lamp according to claim 3, wherein said first ball joint comprises a first ball receiver mounted on said supporting piece of said first bracket and a first aiming screw threadedly joined to said lamp body and having a first ball portion at an outward end thereof received in said first ball receiver, and wherein said second ball joint comprises a second ball receiver mounted on said second protruding piece and having a second ball portion at an outward end of a second aiming screw received in said second ball receiver.

5. The vehicular lamp according to claim 4, further comprising an aiming nut mounted on said first bracket and an aiming screw threadedly jointed to said aiming nut.

6. A vehicular lamp comprising:

a lamp body;

first and second projector lamp units, said first projector lamp unit comprising a reflector, a light source mounted on said reflector, and a condenser lens unit jointed to said reflector, said condenser lens unit comprising a lens holder and a condenser lens held by said lens holder;

a first bracket attached to said first projector lamp unit and formed separately at least from said reflector, said first bracket comprising a vertical piece extending around said first projector lamp unit, a horizontal piece extending forward from a lower end of said vertical piece, and a supporting piece extending downward from a forward end of said horizontal piece;

a second bracket attached to said second projector lamp unit, said second bracket comprising first and second protruding pieces on opposite sides of said second bracket extending horizontally outwards, said first protruding piece being coupled to an adjacent end portion of said supporting piece of said first bracket; and first and second fulcrums tiltably supporting said first and second lamp units through said supporting piece of said first bracket and said second protruding piece, respectively, on said lamp body along an axis including or near a vertical line including a center of gravity of said lamp units.

7. The vehicular lamp according to claim 6, wherein said first fulcrum comprises a first ball joint coupled to an end portion of said supporting piece opposite to said end portion to which said first protruding piece is coupled, and wherein said second fulcrum comprises a second ball joint coupled to said second protruding piece.

8. The vehicular lamp according to claim 7, wherein said first ball joint comprises a first ball receiver mounted on said supporting piece of said first bracket and a first aiming screw threadedly jointed to said lamp body and having a first ball portion at an outward end thereof received in said first ball receiver, and wherein said second ball joint comprises a second ball receiver mounted on said second protruding piece and having a second ball portion at an outward end of a second aiming screw received in said second ball receiver.

9. The vehicular lamp according to claim 8, further comprising an aiming nut mounted on said vertical piece of said first bracket and an aiming screw threadedly jointed to said aiming nut.

10. A vehicular lamp comprising;

a lamp body;

first and second projector lamp units, said first projector lamp unit comprising a reflector, a light source mounted on said reflector, and a condenser lens unit mounted on said reflector, said condenser lens unit comprising a lens holder and a condenser lens held by said lens holder;

a first bracket attached to said first projector lamp unit and formed separately at least from said reflector, said first bracket comprising a supporting piece extending downward;

a second bracket attached to said second projector lamp unit, said second bracket comprising first and second protruding piece on opposite sides of said second bracket extending horizontally outward, said first protruding piece being coupled to an adjacent end of said supporting piece of said first bracket; and a fulcrum structure for tiltably supporting said first and second lamp units on said lamp body along an axis including or near a vertical line including a center of gravity of said lamp units, said fulcrum structure comprising a shaft mounted on said first bracket and a grommet fixed to said lamp body and having a slot receiving said shaft.

11. The vehicular lamp according to claim 10, further comprising an aiming nut mounted on a vertical piece of said first bracket and an aiming screw threadedly jointed to said aiming nut.

* * * * *